United States Patent
Köbel et al.

(10) Patent No.: US 11,568,023 B1
(45) Date of Patent: Jan. 31, 2023

(54) SENSOR ARRANGEMENT AND METHOD FOR OPERATING A SENSOR ARRANGEMENT

(71) Applicant: Leuze electronic GmbH + Co. KG, Owen/Teck (DE)

(72) Inventors: Herbert Köbel, Owen/Teck (DE); Julian Feinauer, Kirchheim/Teck (DE); Hasko Eckhardt, Tübingen (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 0 days.

(21) Appl. No.: 17/522,942

(22) Filed: Nov. 10, 2021

(30) Foreign Application Priority Data

Sep. 29, 2021 (EP) .................................... 21199937

(51) Int. Cl.
*G06F 17/16* (2006.01)
*G01D 5/34* (2006.01)
(52) U.S. Cl.
CPC ............... *G06F 17/16* (2013.01); *G01D 5/34* (2013.01)

(58) Field of Classification Search
CPC ...................................................... G06F 17/16
See application file for complete search history.

(56) References Cited

U.S. PATENT DOCUMENTS

2017/0344620 A1* 11/2017 Modarresi ............ G06K 9/6249

* cited by examiner

*Primary Examiner* — Tony Ko
(74) *Attorney, Agent, or Firm* — Michael Soderman

(57) ABSTRACT

A sensor array (100) with one or more sensors (201-204), with one or more operating means (101-104), each of which labels an object (801, 802), and with a processing unit (501) that is connected to the sensor or the sensors (201-204) via a communication connection (401), wherein each sensor (201-204) is designed for reading and unambiguously identifying an operating means (101-104). In each sensor (201-204), the time at which an operating means (101-104) was detected, the operating means identification of the operating means (101-104), a sensor identification that unambiguously identifies the sensor, and a quality variable q(t, s, b) determined based on time, sensor and operating means for the detection of the operating means (101-104) is sent to the processing unit (501). The invention further relates to a corresponding method.

38 Claims, 10 Drawing Sheets

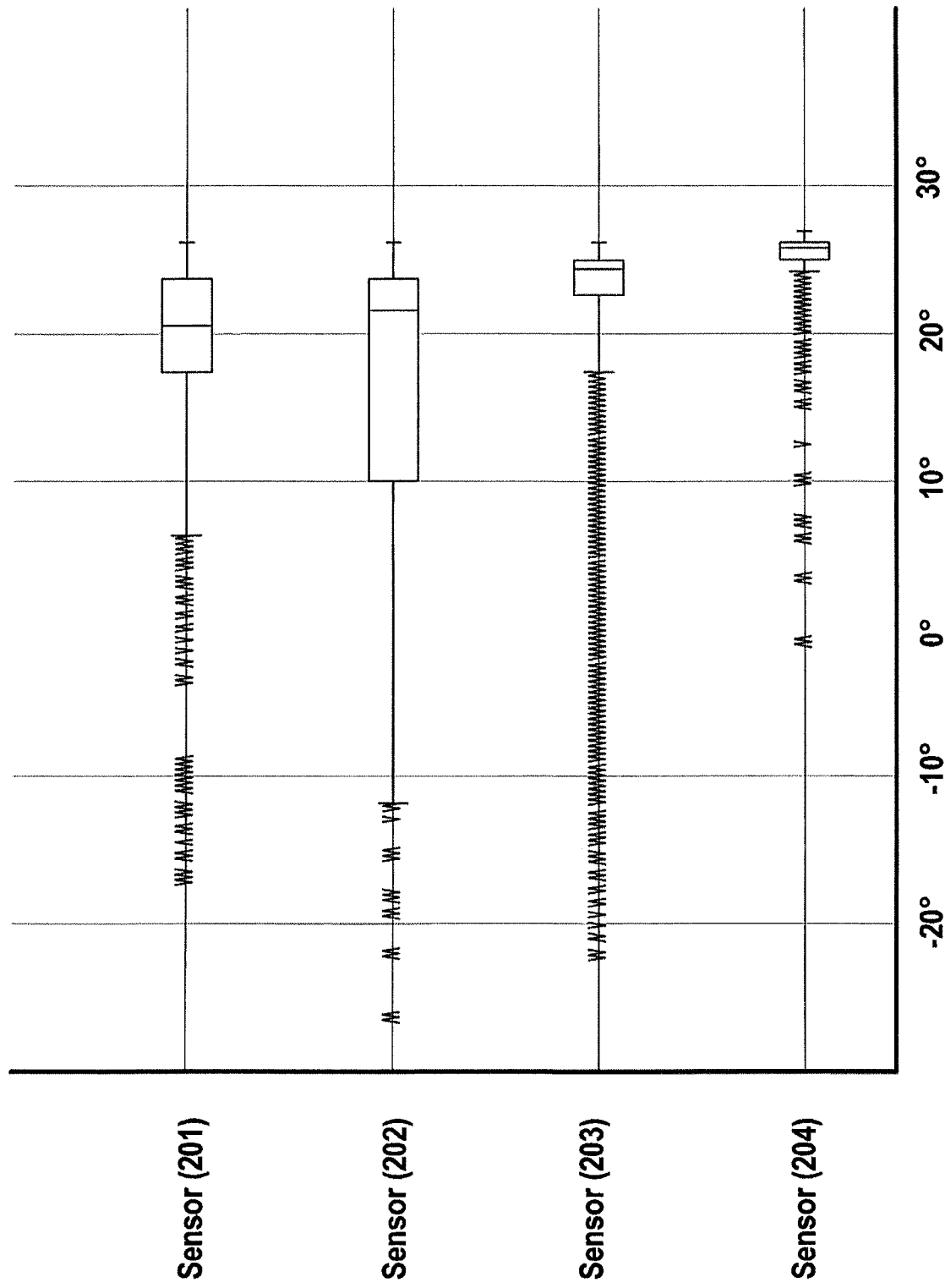

| QEE= | B/A availability factor | x | D/C output factor | x | F/E quality factor |
|---|---|---|---|---|---|
| calendar time | | | | | |
| A operating time | | | | | planned non-production |
| B run time | | | | standstills | |
| C planned quantity | | | | | |
| D actual quantity | | | minor stops, reduced speed | output losses | availability losses |
| E actual quantity | | | | | effectiveness losses |
| F good quantity | defective products, rework, startup losses | | quality losses | efficiency losses | | time / quantity

SENSOR ARRANGEMENT AND METHOD FOR OPERATING A SENSOR ARRANGEMENT

CROSS REFERENCE TO RELATED APPLICATIONS

This application claims the priority of EP 21199937.0 filed on 2021 Sep. 29; this application is incorporated by reference herein in its entirety.

BACKGROUND

The invention relates to a sensor array and a method for operating a sensor array.

Such sensor arrays are used in plants, such as production lines for manufacturing specific goods, to control, manage and monitor work processes.

The sensor array typically comprises an arrangement of sensors arranged in a distributed manner throughout the production line, which sensors are especially designed in the form of optical sensors that constitute code readers. With these code readers, operating means in the form of markings are recognized, which markings are arranged on objects, which are conveyed along the production line. The individual code readers can be connected through a bus system to a joint controller. Based on the markings read by the code readers, the controller can detect which objects are detected by which sensor and thereby control work and/or production processes.

One problem with such plants is that when changes must be made, such as modifying production parameters, this necessitates the involvement of a planner. This requires a relatively high response time.

This approach is especially disadvantageous if faults or impairments of sensor functionalities arise. This includes, especially, incorrect readings of markings on the objects.

In principle, it is possible to detect the quality of read operations carried out on markings by the code readers. An essential problem here, is that it cannot be determined whether the incorrect reading is due to a defect in the marking or due to an impairment of the sensor function of the code reader.

SUMMARY

The invention seeks to solve the problem of providing a sensor array with high functionality.

The features of the independent claims are provided to solve this problem. Advantageous embodiments and useful further developments of the invention are described in the dependent claims.

DETAILED DESCRIPTION

The invention relates to a sensor array with one or more sensors, with one or more operating means, each of which labels an object, and with a processing unit that is connected to the sensor or sensors via a communication connection, wherein each sensor is designed to read and unambiguously identify an operating means. In each sensor, the time at which an operating means was detected, the operating means identification of the operating means, a sensor identification that unambiguously identifies the sensor, and a quality variable $q(t, s, b)$ determined based on the time, sensor and operating means for the detection of the operating means, are sent as sensor data to the processing unit.

Sensor quality values $q(t, s)$ and operating means quality values $q(t, b)$ are separated from measured quality characteristic variables $q(t, s, b)$ by means of a matrix factorization algorithm implemented in the processing unit.

The invention further relates to a corresponding method.

The sensor array according to the invention comprises one sensor and especially advantageously, a plurality of sensors. Operating means that are arranged on objects can be detected using the sensor or plurality of sensors. Using the sensor or plurality of sensors, an operating means can be read and unambiguously identified, through which the object labeled with the operating means can be unambiguously identified as well.

The sensor array can therefore be used especially advantageously in a plant, such as a production line, for example. The sensors of the sensor array are then arranged in a distributed manner throughout the plant or production line. Object tracking is possible based on the operating means detected by the sensors. In addition, work or production processes can be set, changed, managed and monitored based on the operating means detected with the sensors.

Generally, a processing unit is assigned to the sensors of the sensor array, wherein the sensors are connected to the processing unit via a communication connection. For use of the sensor array in a plant, the plant control of the plant is also connected to the processing unit and sensors via the communication connection.

In general, the communication connection can be cabled or wireless in design. In principle, the communication connection can be in the form of a bus system. In particular, the communication connection can be formed by an OPC UA (Open Platform Communications Unified Architecture).

It is advantageous for the operating means to be in the form of markings, which advantageously can be read and identified by sensors in the form of optical sensors.

In general, the markings can be designed as specific geometric and/or reflective object structures.

It is especially advantageous for the markings to be in the form of codes applied to the objects. The codes can be designed especially as 1D barcodes, 2D barcodes or stacked codes, i.e. one-dimensional stacked barcodes.

Accordingly, the optical sensors can be designed as code readers, which can be designed as scanning or camera-based sensors.

It is advantageous for the processing unit to be integrated into a plant control of the plant or integrated in a computing unit assigned to the plant.

Alternatively, the processing unit is integrated into a cloud or implemented in an OS-level virtualization system.

An OS-level virtualization system is a system in which multiple instances of an operating system [guest OS] use the channel of a host operating system in isolation from one another.

Finally, it is possible for the processing unit to be integrated into one of the sensors.

According to the invention, not only an operating means identification based on a read operating means, but rather also a sensor identification that unambiguously identifies the sensor, and also a quality characteristic variable $q(t, s, b)$ that is determined upon reading an operating means, are sent by each sensor in the sensor arrangement to the processing unit as sensor data.

The quality characteristic variable $q(t, s, b)$ is time-dependent and dependent on the sensor that reads the operating means and on the operating means itself.

This quality characteristic variable $q(t, s, b)$ comprises properties of the operating means, i.e. codes, especially their reflectivity, the contrast of the operating means, the number of read operations required by the sensor to detect the operating means, and if applicable, necessary error corrections during evaluation of read operations or variables derived therefrom.

According to the invention, a sensor quality value q(t, s) and an operating means quality value q(t, b) are obtained from the quality characteristic variable q(t, s, b) by means of a matrix factorization algorithm, i.e. separate quality values are obtained for the sensor and the operating means. According to the invention, the qualities of the sensors, on the one hand, and of the operating means, on the other hand, can be detected individually and independently from one another in this manner. This results in a significant expansion of the functionality of the sensor array, since immediately upon the read operations being performed with the sensors on operating means, the quality, and therefore, the current operability of the sensors and operating means can be detected independently from one another.

The sensor quality values and the operating means quality values can be displayed to a user, wherein especially the development over time of these quality values can be displayed. This allows the user to visually examine all components of the sensor array separately.

Furthermore, the quality values can be used to perform management or control functions of the sensor array and especially of a plant monitored by the sensor array. Here it is advantageous that these management functions or control functions are performed in an automated manner, wherein they can be initiated immediately after the determination of the quality values.

It is advantageous for a matrix $M_{ij}$ to be formed for the matrix factorization algorithm, wherein one index i or j refers to the sensors of the sensor array and the other index j or i refers to the operating means of the sensor array. Quality characteristic variables $q_{ij}$ are determined for the matrix $M_{ij}$ by the sensors of the sensor arrangement in a calibration operation. An ansatz for the dependency of the quality characteristic variables on the sensor quality values q(t, s) and the operating means quality values q(t, b) is selected in the form of a function $f(q_s, q_b)$. The values of this function are fitted to the matrix values of the quality characteristic variables $q_{ij}$ determined in the calibration operation.

In the matrix factorization algorithm, an ansatz for the dependency of the measurable quality characteristic variables on the sensor and, respectively, operating means factors, is chosen in the form of hidden, i.e. non-measurable, variables $q_s$, $q_b$. Generally this relationship can be expressed in the form of a function $f(q_s, q_b)$, wherein in the simplest case, this function is composed of the product of $q_s \cdot q_b$.

Since the sensor array generally has an arrangement of I sensors and J operating means and since in the sensor array each sensor can detect each operating means and the measurement of a quality characteristic variable can be determined for each combination, a matrix $q_{ij}$ of quality characteristic variables results.

The measurement values $q_{ij}$(t, s, b) are determined during a preset measuring time during operation of the sensor array for monitoring a plant. Depending on how the objects labeled with the operating means are conveyed along the plant, certain operating means are detected once, multiple times or not at all by individual sensors. Consequently, one measurement value, no measurement value, or multiple measurement values are obtained for the individual matrix values $q_{ij}$.

The function $f(q_s, q_b)$ is then fitted such that an optimal fit or also multiple fits result for the measurement values $q_{ij}$. Common optimization methods, such as the method of least squares, can be used for this. It is advantageous for AI (Artificial Intelligence) algorithms to be used especially with high-dimensional matrices $q_{ij}$.

With such matrix factorization algorithms, the hidden variables $q_s$, $q_b$ are determined for the quality characteristic variables, i.e. the quality characteristic variables q(t, s, b) are separated into sensor quality values q(t, s) and operating means quality values q(t, b).

It is advantageous for the design of the processing unit to be adapted to these calculations such that the processing unit has a data acquisition unit for storing sensor data and a calculation unit for calculating the quality values q(t, s), q(t, b).

It is useful for characteristic values to be calculated in the calculation unit based on the quality values q(t, s), q(t, b).

According to an advantageous embodiment, an operating unit is assigned to the processing unit, which is designed for inputting input values and outputting output values.

Sensor quality values q(t, s) and operating means quality values q(t, b) and/or characteristic values derived therefrom can then be displayed on the operating unit.

Especially the development over time of quality values q(t, s), q(t, b) and/or characteristic values derived therefrom are visualized at the calculation unit.

Input values can be input using the operating unit to select from among displayed quality values or characteristic values.

It is advantageous for the operating unit to have an internet interface.

An internet-capable display system is thereby provided.

According to an advantageous embodiment, a fitness value h(T, s) is determined for each sensor for a preset observation time interval T, which fitness value h(T, s) specifies the probability of the sensor quality value q(t, s) determined at this sensor being greater than a threshold value S. Moreover, a fitness value h(T, b) is determined for every operating means, which fitness value h(T, b) specifies the probability of the operating means quality value q(t, b) determined for this operating means being greater than a threshold value $S_b$.

The sensors and/or operating means for the fitness values h(T, s), h(T, b) can be determined, selected and/or observation intervals T and/or threshold values can be preset as parameters by inputting input values into the operating unit.

Generally the threshold values can also be optimized during operation of the sensor array by means of AI (artificial intelligence) algorithms.

The fitness values h(T, s) provide a reliable measure for the operating fitness of the sensors. Separately and independently therefrom, the fitness values h(T, b) provide an equally reliable measure for the operating fitness of the operating means, especially of the codes. Especially remaining service lifetimes of sensors and/or operating means can be determined based on fitness values h(T, s), h(T, b).

Displaying the fitness values gives the user an overview of the operating fitness of all components of the sensor array.

It is especially advantageous for improvement potentials to be determined from a comparison of fitness values h(T, s), h(T, b).

These improvement potentials are determined in that the best fitness value is taken as a reference and then, the difference relative to the reference is determined for all other fitness values. The greater the difference, the greater the improvement potential for the respective sensor or the respective operating means. The user can use this to perform repairs, maintenance, or even to exchange sensors or operating means that have high improvement potential in order to replace them with new sensors or operating means.

It is further advantageous for reproducibility values to be determined from fitness values h(T, s), h(T, b).

To do so, especially the statistical spread (standard deviations) of the fitness values are determined. The lower the spread, the better the reproducibility.

According to an advantageous embodiment, action instructions are determined based on fitness values h(T, s), h(T, b).

The action instructions can be translated into machine-readable commands and automatically run in the processing unit. In this manner, the operating fitness of the sensor array can be continuously improved in an automatic process.

Improvement potentials can also especially be used for generating action instructions. To do so, it is preferable for a range categorization of the improvement potentials to be performed.

If an improvement potential lies in a low range, there is no need for action, since the corresponding sensor or the operating means is fully or nearly fully fit for operation.

If an improvement potential, for example, for a sensor, lies in a middle range, the action instruction that the sensor must be cleaned or aligned can be generated.

If an improvement potential lies in a high range, an action instruction can be to replace the affected sensor or operating means.

According to another advantageous embodiment, machine-readable control commands are generated from fitness values h(T, s), h(T, b).

The control commands can be fed to the plant control of the plant, especially to MES or ERP systems provided there, in order to control the plant dependent on determined fitness values.

It is further advantageous for parameterization instructions for sensors to be generated from fitness values h(T, s), h(T, b).

For this, a suitable software is implemented in the sensors, with which software the parameterization instructions are directly executed to configure the sensor accordingly.

A change of the parameter values is performed especially for sensors with high improvement potentials in order to improve their operating fitness.

It is useful for the parameterization instructions to be transmitted only to those sensors that correspond, with regard to their functionality, to the sensors from which the parameterization instructions were obtained based on their fitness values.

Incorrect parameterization of sensors is thereby excluded.

According to an advantageous further development, parameterization instructions determined for sensors of a plant are transmitted to sensors of a different plant.

In this manner, an autonomous parameterization of sensors can be performed across all involved plants.

According to an advantageous embodiment, the sensor array has multiple sensors provided at different locations and a path analysis of an operating means along the sensors is performed in the processing unit.

On the one hand, this allows the path of an operating means through a plant to be tracked. On the other hand, it is possible to analyze by which sensors the operating means are detected on their path.

It is especially advantageous for a path analysis to be performed for each operating means such that within a preset time interval, a chronological sequence is produced of which sensors the operating means were detected by, wherein based on the chronological sequence, a path is reconstructed, which path is composed of individual path segments, which path segments are composed of pairs of sensors, which respectively have detected the operating means.

For every path segment of the path of an operating means, the absolute frequency at which this path segment was traveled during the time interval is determined.

The paths and/or the frequencies of traveled path segments are visualized as a result.

In this manner, it can be analyzed where an operating means was located over time and what paths were taken especially frequently or rarely. In addition, it can be analyzed which sensors are used especially frequently or rarely for detection of operating means. Finally, unequal loads can be discovered. Based on this, the operation of a plant can be optimized such that it has a more even load distribution, whereby a higher capacity of the plant can be achieved.

According to an advantageous further development of the invention, additional measurement values are separated from the quality characteristic variables, aside from the sensor quality values q(t, s) and operating means quality values q(t, b).

One example of this is the detection of ambient light or stray light. Such additional incident light rays change the receiving level of the sensors, i.e., these influences can be detected through sensor signals of the sensors themselves.

To separate these influence quantities from the sensor quality values q(t, s) and the operating means quality values q(t, b), the matrix factorization algorithm can be extended such that an additional hidden variable $q_u$ is introduced for the environmental influences due to incident light rays, in addition to the hidden variables $q_s$, $q_b$, respectively for the sensor influences and the operating means influences.

Alternatively or additionally, environmental sensors are provided for acquiring additional measurement values.

Examples of such environmental sensors are sensor means for acquiring the sensor temperature or ambient temperature. Moreover, sensor means for detecting vibrations or humidity can be provided. Finally, the angular positions of the scans of operating means performed with the sensors can also be acquired.

In general, the additional measurement values are correlatable to the sensor quality values q(t, s) and the operating means quality values q(t, b).

These additional measurement values can also be visualized. Fitness values and/or improvement values can also be determined for these measurement values.

BRIEF DESCRIPTION OF THE DRAWINGS

The invention is explained below based on the drawings. They show:

FIG. 9A: A depiction of angular positions for sensors of the sensor array according to FIGS. 1 and 2.

FIG. 10: An example of an OEE (overall equipment effectiveness) calculation for a sensor of the sensor array according to FIGS. 1 and 2.

DETAILED DESCRIPTION OF THE PREFERRED EMBODIMENTS

Figure 1:
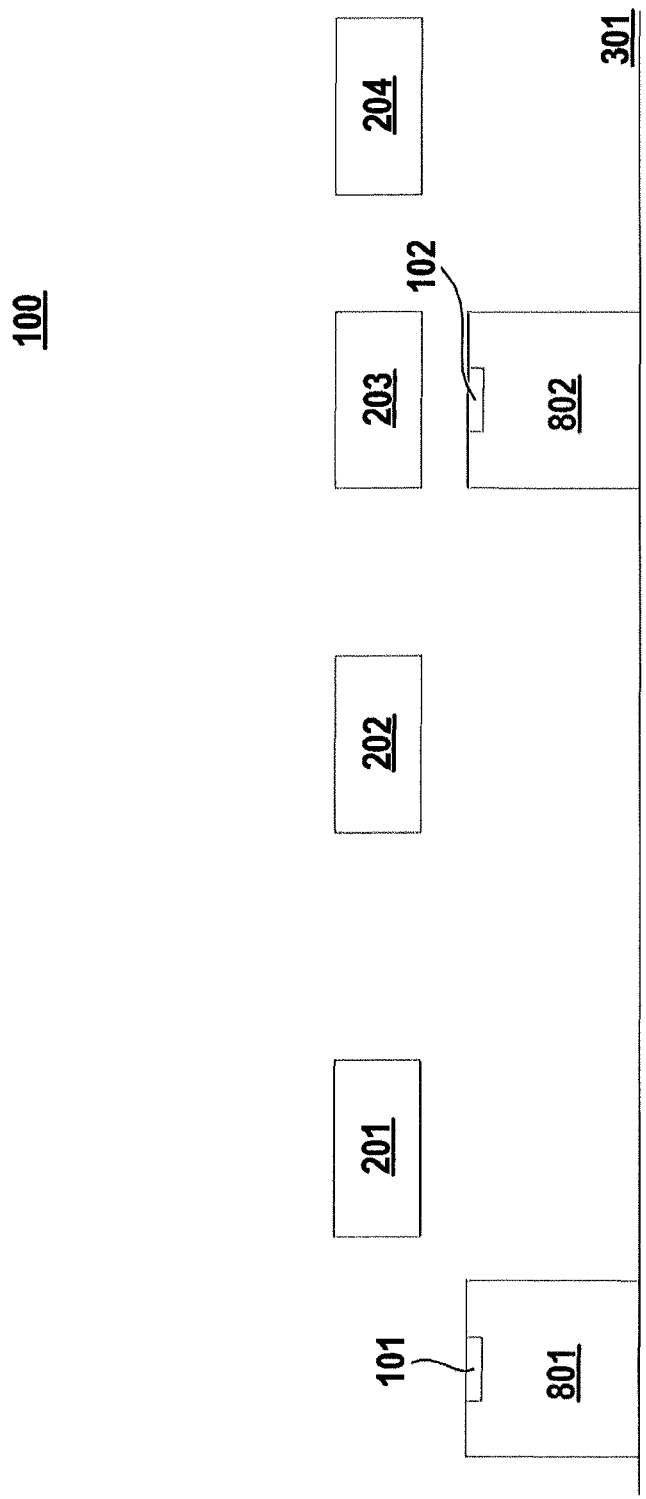
FIG. 1: A schematic depiction of an exemplary embodiment of the sensor array according to the invention.
Figure 2:
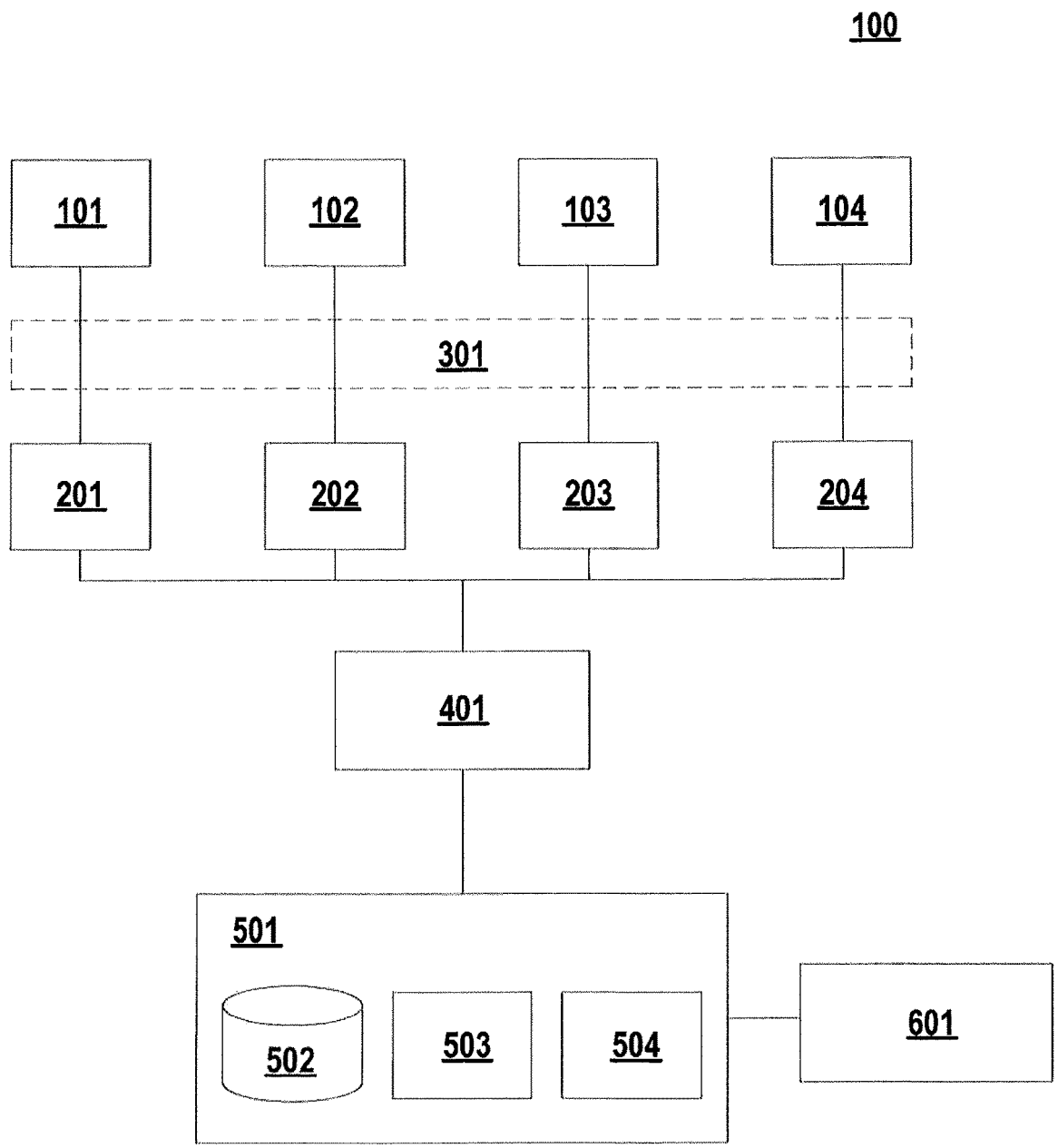
FIG. 2: A block circuit diagram of the sensor array according to FIG. 1.

FIG. 1 shows a schematic depiction of an exemplary embodiment of the sensor array 100 according to the invention. FIG. 2 shows a block circuit diagram of this sensor array 100.

The sensor array 100 comprises an arrangement of sensors 201-204, which in the present case are designed as optical sensors in the form of code readers. The code readers can be designed in the form of scanners or camera sensors. The sensors 201-204 are arranged at preset workstations of a production line 301. Objects 801, 802 with which work processes are performed or which are required to perform work processes, are conveyed along the production line 301. Each object 801, 802 is unambiguously labeled with an operating means 101-104 in the form of a code. When an object 801, 802 is located in the reading range of a sensor 201-204, the code applied to the object 801, 802 can be read.

Of course, the topology of the sensor array 100 as well as the number of sensors 201-204 and operating means 101-104 are not limited to those shown in the depictions in FIGS. 1 and 2.

As shown in FIG. 2, the sensors 201-204 are connected to a processing unit 501 via a communication connection 401. The processing unit 501 comprises a memory unit 502, a data acquisition unit 503 and a calculation unit 504. It is advantageous for the memory unit 502 to be integrated in the data acquisition unit 503.

The processing unit 501 is connected to an operating unit 601, which is designed for data input and output.

Figure 3:
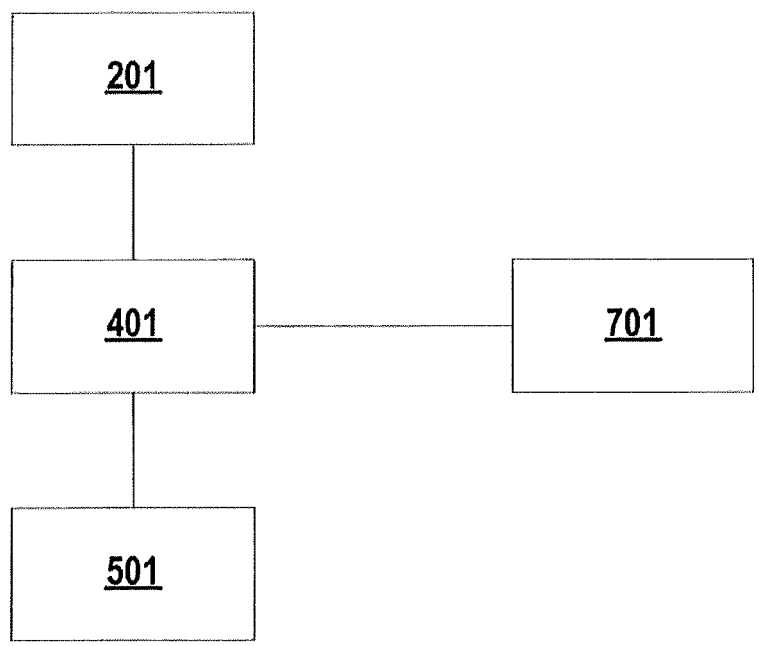
FIG. 3: A first variant of a further development of the sensor array according to FIG. 2.
Figure 4:
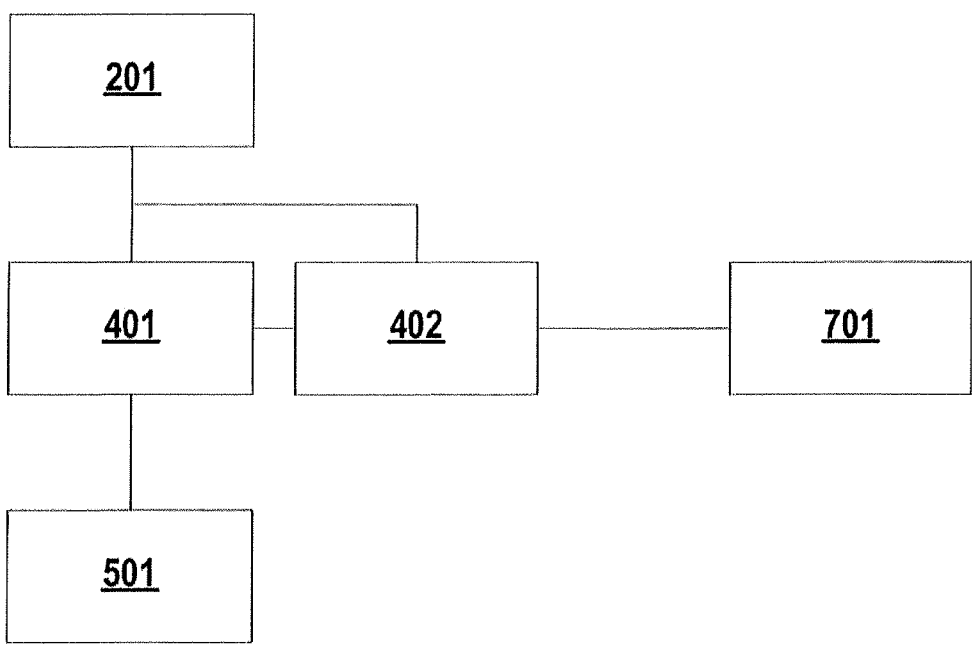
FIG. 4: A second variant of a further development of the sensor array according to FIG. 2.

FIGS. 3 and 4 show two variants of an extension of the sensor array 100 from FIG. 2 such that a plant control 701 of a plant, which plant control 701 controls the production line 301, is integrated. In the arrangement from FIG. 3, the communication connection 401 is used for connecting the plant control 701. In the arrangement from FIG. 4, a control connection 402 is provided as a second communication channel for connecting the plant control 701. This second communication channel uses a hardware or software interface of its own, for example, such that the second communication channel uses the same connection as the first communication channel, such as Ethernet, wherein different software connections (ports) are used, however.

According to the invention, upon detection of an operating means 101-104 by means of a sensor 201-204, both the operating means identification as well as the own sensor identification and a quality characteristic variable q(t, s, b) determined upon detection of the operating means 101-104 are sent as sensor data to the processing unit 501 and stored in the memory unit 502.

The quality characteristic variable q(t, s, b) is a time-dependent value and is a function of parameters of the sensor 201-204 as well as parameters of the read operating means 101-104.

This quality characteristic variable q(t, s, b) comprises properties of the operating means 101-104, i.e., codes, especially their reflectivity, the contrast of the operating means 101-104, the number of read operations of the sensors 201-204 required for detection of the operating means 101-104, and, if applicable, necessary error corrections upon evaluation of read operations or values derived therefrom.

According to the invention, a sensor quality value q(t, s) and an operating means quality value q(t, b) are obtained in the processing unit from the quality characteristic variable by means of a matrix factorization algorithm, i.e., separate quality values are obtained for each sensor 201-204 and each operating means 101-104. According to the invention, it is thereby achieved that the qualities of the sensors 201-204, on the one hand, and the qualities of the sensors 201-204, on the other hand, can be acquired individually and independently from one another.

The sensor quality values q(t, s) and the operating means quality values q(t, b) can be displayed to a user by means of the operating unit 601, wherein especially also the development over time of these quality values can be displayed.

Moreover, a fitness value h(T, s) is determined for each sensor 201-204 for a preset observation time interval T, wherein the fitness value specifies the probability that the sensor quality value q(t, s) determined at this sensor 201-204 is greater than a threshold value S. In addition, a fitness value h(T, b) is determined for each operating means 101-104, wherein the fitness value specifies the probability that the operating means quality value q(t, b) determined for this operating means 101-104 is greater than a threshold value $S_b$.

A user can preset the observation time interval and the threshold values $S_s$, $S_b$ via the operating unit 601.

The fitness values provide a measure for the operational fitness of the sensors 201-204 and operating means 101-104.

Figure 5:
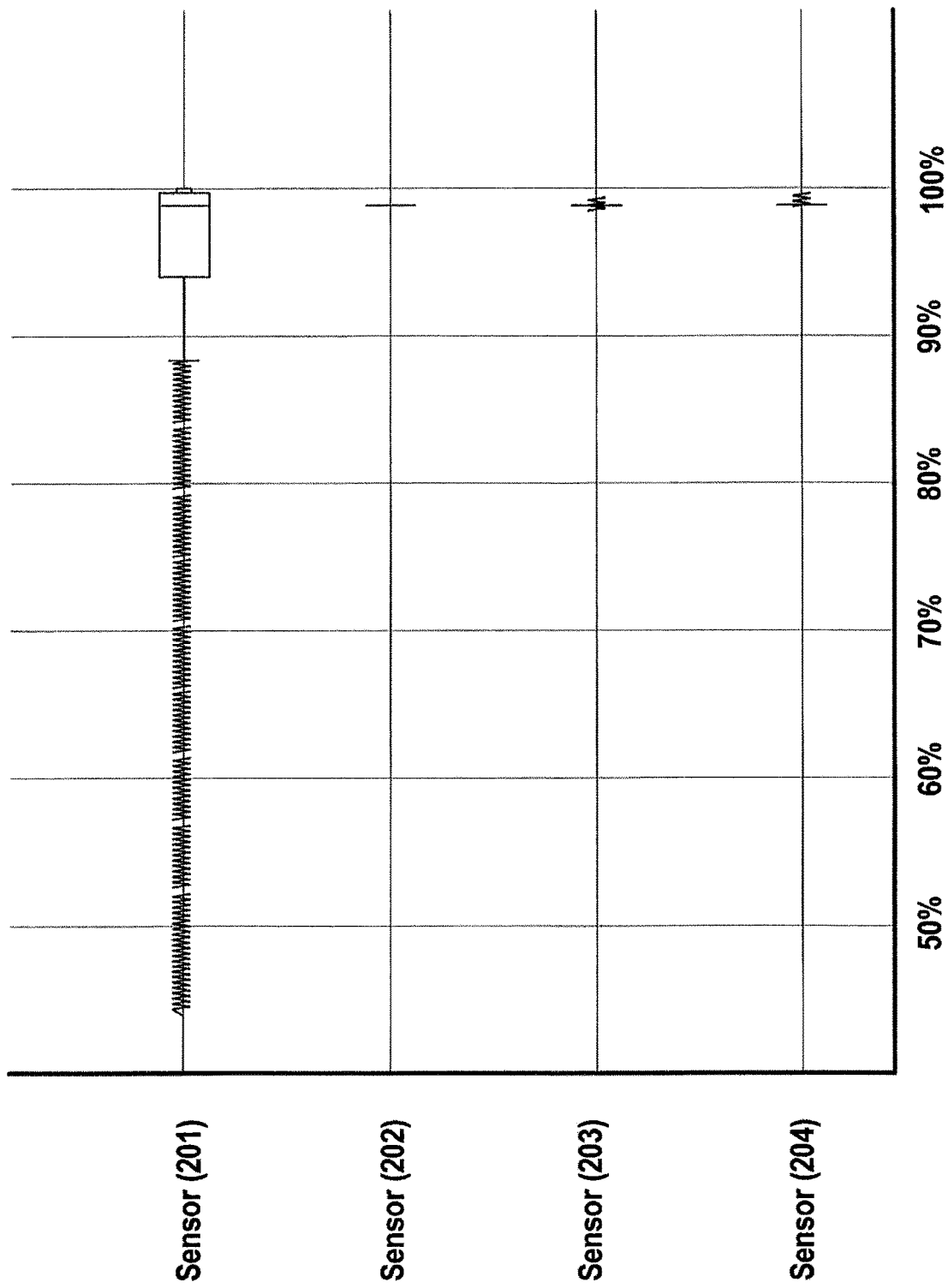
FIG. 5: A diagram with fitness value for the sensor array according to FIGS. 1 and 2.

FIG. 5 shows examples of such fitness values for the sensors 201-204. The fitness values are scaled to values from 0% to 100%, wherein the value 100% corresponds to full, unrestricted operational fitness and the value 0% corresponds to completely insufficient operational fitness.

As shown in FIG. 5, the sensor 201 has the lowest fitness value and the sensor 204 has the highest fitness value.

These fitness values can be visualized at the operating unit 601.

Improvement potentials can be derived from the fitness values. To do so, the highest fitness value is taken as a reference and the difference relative to this reference is determined for the remaining fitness values.

Figure 6:
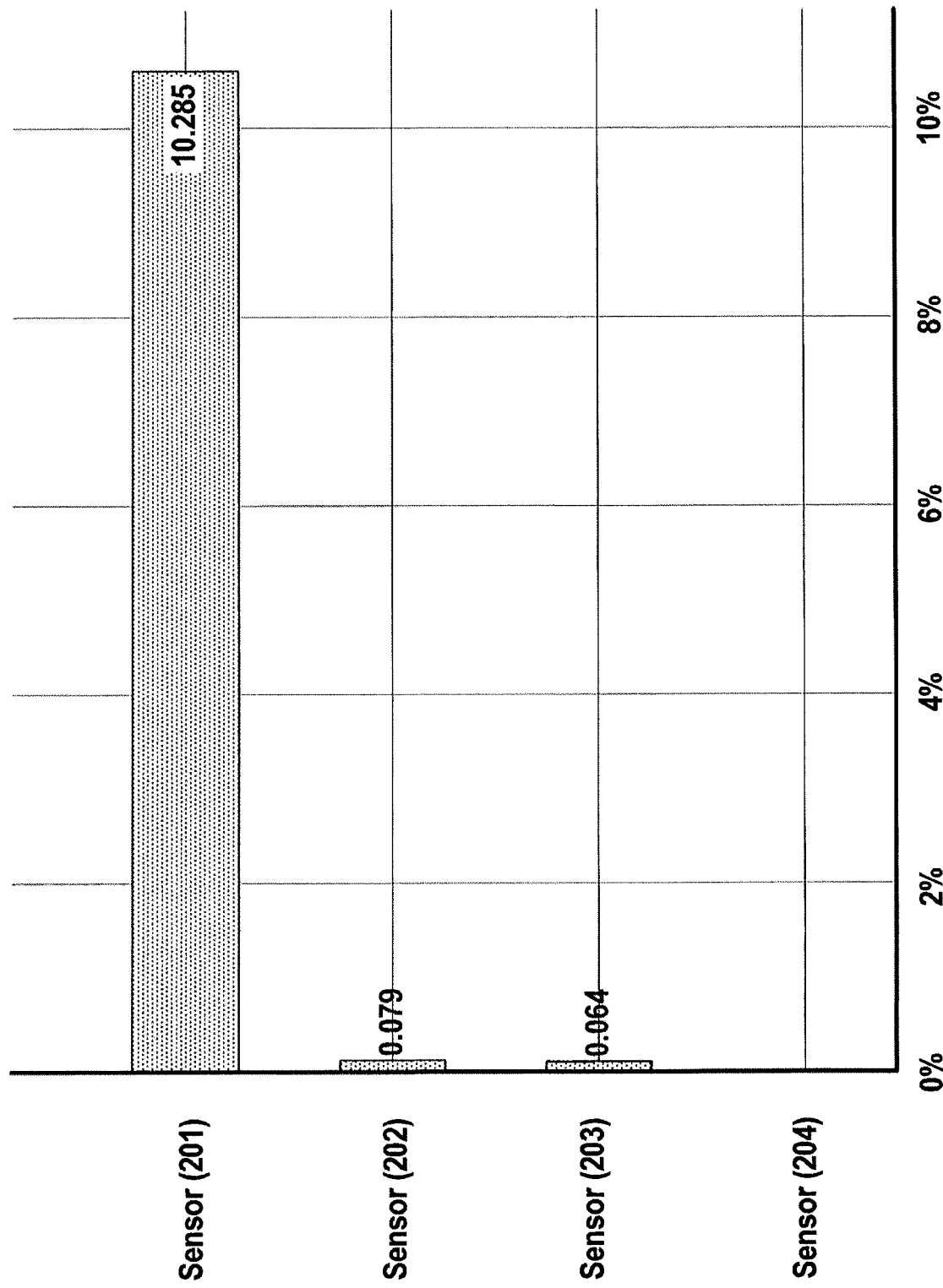
FIG. 6: A diagram with improvement potential for the sensor array according to FIGS. 1 and 2.

FIG. 6 shows the result of the improvement potentials derived from the fitness values from FIG. 5. The sensor 204 has the highest fitness value, which serves as reference. With this, the improvement potentials depicted in FIG. 6 for the sensors 201-204 are obtained, which improvement potentials can also be visualized by means of the operating unit 601.

As is evident from FIG. 6, the sensor 201 has a high improvement potential. This alerts the user to a need for action, for example, such that the sensor 201 must be replaced. The other sensors 202, 203 have low improvement potentials, such that they can be further operated without additional measures.

To generate a measure for the reproducibility of the fitness values and/or improvement potentials, the spread for the fitness values can be calculated.

Action instructions as well, especially including control commands, can be generated based on the fitness values, which action instructions can be transmitted in machine-readable form to the plant control 701 and directly executed there.

Moreover, parameterization instructions can be derived from the fitness values for sensors 201-204 for these or similar sensors.

Finally, remaining service lifetimes for sensors 201-204 can be determined based on fitness values.

A path analysis can be produced for the sensor array 100 that specifies which operating means 101-104 are detected by which sensors 201-204 at which times. The results of such path analyses can be visualized by means of the operating unit 601.

Figure 7:
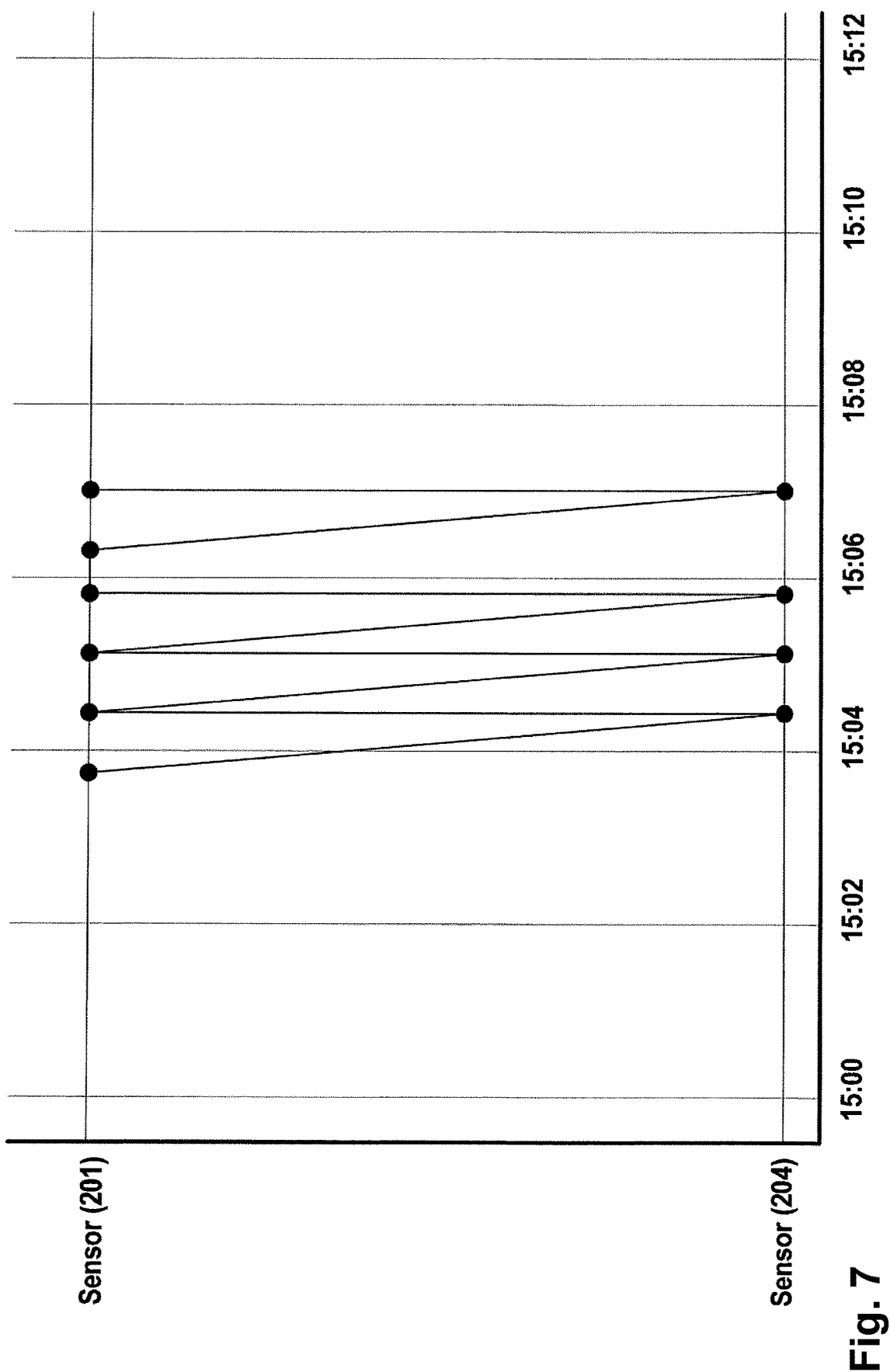
FIG. 7: An example of a path analysis for the sensor array according to FIGS. 1 and 2.

FIG. 7 shows the result of such a path analysis for a sensor array 100 with the sensors 201-204, for which the fitness values according to FIG. 5 were also calculated.

FIG. 7 shows the path of a product labeled with an operating means 101 through the plant. Here, the path of the operating means 101 is plotted over a preset time interval (in this case, from 3:00 μm to 3:12 pm).

As is evident from FIG. 7, the operating means 101 switches multiple times between sensors 201 and 204 over a short time, which indicates a problem for the product in the work process. Moreover, it is evident that the sensors 202, 203 are not used at all, such that no load is present for them during the observation period.

In general, the matrix factorization algorithm can be extended such that additional measurement values can be prepared from the quality characteristic variables q(t, s, b) determined by direct measurement, such as influences due to ambient light.

Alternatively or additionally, environmental sensors, such as temperature sensors, can be provided for acquiring additional measurement values.

These measurement values can be correlated with the sensor quality values and operating means quality values.

Figure 8:
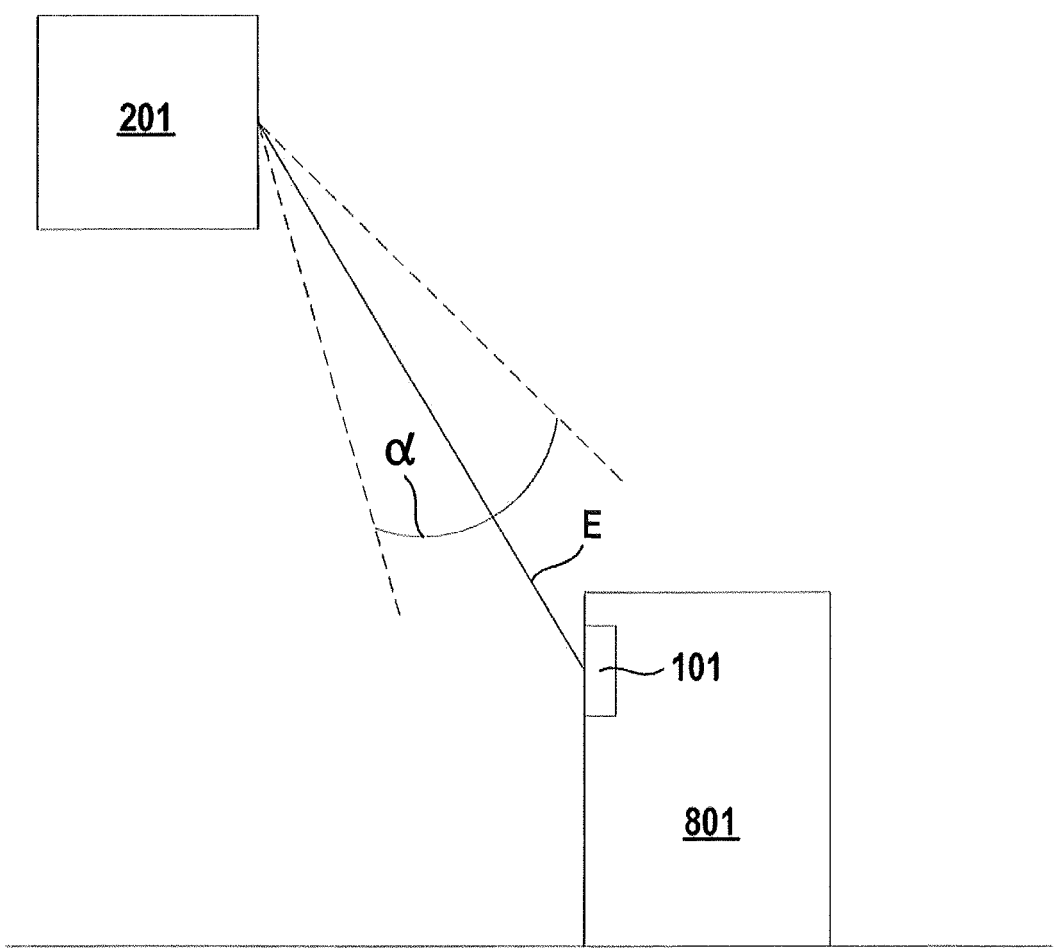
FIG. 8: A depiction of a range of angular positions for a sensor of the sensor array according to FIGS. 1 and 2.

An example of such a measurement value is the angular position of an operating means 101 within a scanning beam E of a sensor 201, as is depicted schematically in FIG. 8. The angular position can vary within the angular range oc.

Figure 9B:
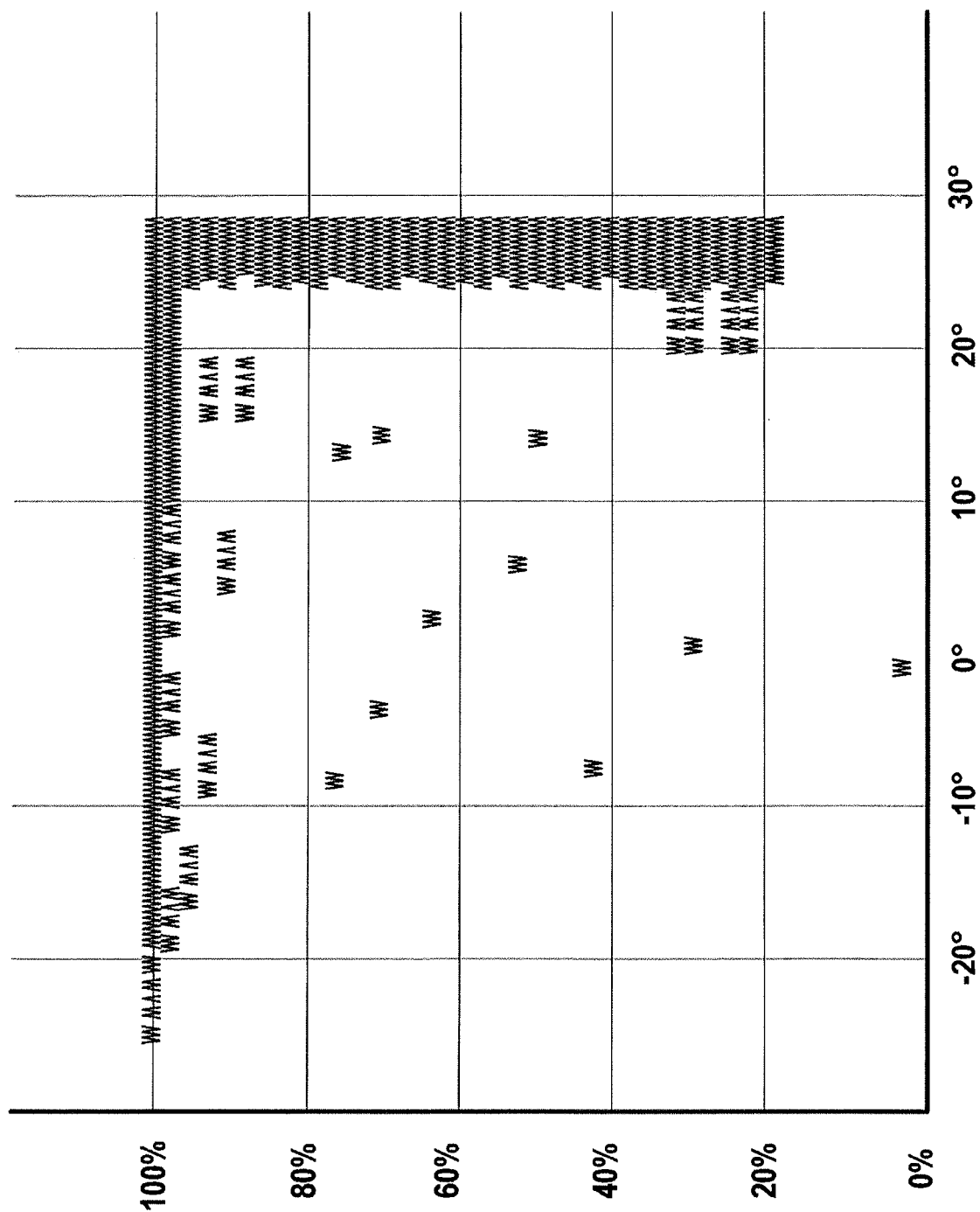
FIG. 9B: A correlation of the angular positions according to FIG. 9A with quality value.

FIG. 9a shows the variation of the angular positions. These angular positions can be contrasted with the corresponding sensor quality values or the fitness values to visualize irregularities. The result is shown in FIG. 9b.

As is shown as an example in FIG. 10, the sensor quality values q(t, s) and operating means quality values q(t, b) determined for the sensor array 100, as well as characteristic values derived therefrom, can be drawn on for complex evaluations, such as KPI (key performance indicator) evaluations, by means of which OEE (overall equipment effectiveness) characteristic values can be calculated, which represent measurement figures for the overall plant effectiveness of plants. These evaluations can also be visualized at the operating unit 601.

In FIG. 10, F represents the number of successful scans, i.e., successful reads, during an observation period A (operating time) of an operating means 101-104 by a sensor 201-204. D and E are the total number of scans performed with the sensor 201-204 during the observation period. C is a user input and defines a target quantity per unit time, extrapolated to the observation period. The run time B corresponds to the difference of the observation period minus the time during which there are no measurements by the sensor. The quality factor F/E corresponds to the fitness value h(t, s) of the sensor 201-204 that was calculated for a threshold value $S_s$, where especially $S_s=0$.

From this are derived quality losses as efficiency losses and output losses as effectiveness losses due to minor stops or reduced speeds for conveying products as well as availability losses due to plant standstill times.

LIST OF REFERENCE NUMERALS (100) sensor array
(101-104) operating means
(201-204) sensors
(301) production line
(401) communication connection
(402) control connection
(501) processing unit
(502) memory unit
(503) data acquisition unit
(504) calculation unit
(601) operating unit
(701) plant control
(801, 802) objects
E scanning beam
T observation time interval

The invention claimed is:

1. A sensor array (100) with one or more sensors (201-204), with one or more operating means (101-104) each of which labels an object (801, 802), and with a processing unit (501), which is connected to the sensor or sensors (201-204) via a communication connection (401), wherein each sensor (201-204) is designed for reading and unambiguously identifying an operating means (101-104), characterized in that in each sensor, the time at which an operating means (101-104) was detected, the operating means identification of the operating means (101-104), a sensor identification unambiguously identifying the sensor (201-204) and a quality characteristic variable q(t, s, b) determined for detection of the operating means (101-104) dependent upon time, sensor and operating means, are sent to the processing unit (501) as sensor data, and that sensor quality values q(t, s) and operating means quality values q(t, b) are separated from measured quality characteristic variables q(t, s, b) by means of a matrix factorization algorithm implemented in the processing unit (501).

2. The sensor array (100) according to claim 1, characterized in that a fitness value h(T, s) is determined for a preset observation time interval T for each sensor (201-204), which specifies the probability of the sensor quality value q(t, s) determined at this sensor (201-204) being greater than a threshold value $S_s$, and a fitness value h(T, b) is determined for each operating means (101-104), which specifies the probability of the operating means quality value q(t, b) determined for this operating means (101-104) being greater than a threshold value $S_b$.

3. The sensor array (100) according to claim 2, characterized in that the sensors (201-204) and/or operating means (101-104) for which the fitness values h(T, s), h(T, b) are determined, and/or observation time intervals T and/or threshold values $S_s$, $S_b$, can be preset.

4. The sensor array (100) according to claim 2, characterized in that improvement potentials are determined from a comparison of fitness values h(T, s), h(T, b).

5. The sensor array (100) according to claim 2, characterized in that reproducibility values are determined from fitness values h(T, s), h(T, b).

6. The sensor array (100) according to claim 2, characterized in that action instructions are determined from fitness values h(T, s), h(T, b).

7. The sensor array (100) according to claim 2, characterized in that machine-readable control commands are generated from fitness values h(T, s), h(T, b).

8. The sensor array (100) according to claim 2, characterized in that parameterization instructions for sensors (201-204) are generated from fitness values h(T, s), h(T, b).

9. The sensor array (100) according to claim 8, characterized in that the parameterization instructions are only transmitted to those sensors which, with regard to their functionality, correspond to those sensors (201-204) from the fitness values of which the parameterization instructions are obtained.

10. The sensor array (100) according to claim 8, characterized in that parameterization instructions determined for sensors (201-204) of a plant are transmitted to sensors of a different plant.

11. The sensor array (100) according to claim 2, characterized in that remaining service lifetimes of sensors (201-204) and/or operating means (101-104) are determined from fitness values h(T, s), h(T, b).

12. The sensor array (100) according to claim 1, characterized in that it has multiple sensors (201-204) provided at different locations, and that a path analysis of an operating means (101-104) along the sensors (201-204) is performed in the processing unit (501).

13. The sensor array (100) according to claim 1, characterized in that additional measurement values can be separated from the quality characteristic variables, aside from the sensor quality values q(t, s) and operating means quality values q(t, b).

14. The sensor array (100) according to claim 1, characterized in that environmental sensors are provided for acquiring additional measurement values.

15. The sensor array (100) according to claim 13, characterized in that the additional measurement values are correlatable to the sensor quality values q(t, s) and the operating means quality values q(t, b).

16. The sensor array (100) according to claim 1, characterized in that the operating means (101-104) are designed as markings.

17. The sensor array (100) according to claim 16, characterized in that the operating means (101-104) are designed as codes.

18. The sensor array (100) according to claim 1, characterized in that the sensor or each sensor (201-204) is an optical sensor.

19. The sensor array (100) according to claim 18, characterized in that the optical sensor is a code reader.

20. The sensor array (100) according to claim 1, characterized in that the sensors (201-204) are arranged on a plant, wherein work processes are performed by means of the plant with the objects (801, 802).

21. The sensor array (100) according to claim 20, characterized in that the processing unit (501) is integrated into a plant control (701) of the plant or is integrated in a computing unit assigned to the plant.

22. The sensor array (100) according to claim 1, characterized in that the processing unit (501) is integrated in a cloud or in an OS-level virtualization system.

23. The sensor array (100) according to claim 1, characterized in that the processing unit (501) is integrated into one of the sensors (201-204).

24. The sensor array (100) according to claim 1, characterized in that the processing unit (501) has a data acquisition unit (503) for storing sensor data and a calculation unit (504) for calculating the quality values q(t, s), q(t, b).

25. The sensor array (100) according to claim 24, characterized in that derived characteristic values are calculated from the quality values q(t, s), q(t, b) in the processing unit (501).

26. The sensor array (100) according to claim 1, characterized in that an operating unit (601) is assigned to the processing unit, which operating unit (601) is designed for input of input values and output of output values.

27. The sensor array (100) according to claim 26, characterized in that sensor quality values q(t, s) and operating means quality values q(t, b) and/or characteristic values derived therefrom are displayed at the operating unit (601).

28. The sensor array (100) according to claim 27, characterized in that the development over time of quality values q(t, s), q(t, b) and/or characteristic values derived therefrom are visualized at the operating unit (601).

29. The sensor array (100) according to claim 26, characterized in that the operating unit (601) has an internet interface.

30. A method for operating a sensor array (100) with one or more sensors (201-204), with one or more operating means (101-104) each labeling an object (801, 802), and with a processing unit (501) that is connected to the sensor or the sensors (201-204) via a communication connection (401), wherein each sensor (201-204) is designed for reading and unambiguously identifying an operating means (101-104), characterized in that in each sensor (201-204), the time at which an operating means (101-104) was detected, the operating means identification of the operating means (101-104), a sensor identification unambiguously identifying the sensor (201-204) and a quality characteristic variable q(t, s, b) dependent upon time, sensor and operating means determined for the detection of the operating means (101-104) are transmitted to the processing unit (501) as sensor data, and in that sensor quality values q(t, s) and operating means quality values q(t, b) are separated from measured quality characteristic variables q(t, s, b) by means of a matrix factorization algorithm implemented in the processing unit (501).

31. The method according to claim 30, characterized in that a matrix $M_{ij}$ is formed for the matrix factorization algorithm, wherein one index i or j refers to the sensors (201-204) of the sensor array (100) and the other index j or i refers to the operating means (101-104) of the sensor array (100), that quality characteristic values $q_{ij}$ are determined for the matrix $M_{ij}$ during a calibration operation with the sensors (201-204) of the sensor array (100), that an ansatz for the dependency of the quality characteristic values on the variables $q_s$, $q_b$ corresponding to the sensor quality values q(t, s) and the operating means quality values q(t, b) is selected in the form of a function $f(q_s, q_b)$, and that the function values of this function are fitted to the matrix values of the quality characteristic values $q_{ij}$ determined during the calibration operation.

32. The method according to claim 31, characterized in that the function values are fitted by means of an optimization method.

33. The method according to claim 32, characterized in that the optimization method contains an error minimization.

34. The method according to claim 31, characterized in that $f(q_s, q_b) = q_s \cdot q_b$ is selected as the ansatz.

35. The method according to claim 31, characterized in that AI (artificial intelligence) algorithms are used to calculate the function values of the function.

36. The method according to claim 30, characterized in that a path analysis is performed for each operating means (101-104) such that a chronological sequence is produced of which sensors (201-204) the operating means (101-104) were detected by, wherein based on the chronological sequence, a path is produced, which path is composed of individual path segments, which path segments are composed of pairs of sensors (201-204), which respectively have detected the operating means (101-104) successively.

37. The method according to claim 36, characterized in that the absolute frequency at which this path segment was traveled during the time interval is determined for every path segment of the path of an operating means (101-104).

38. The method according to claim 37, characterized in that the paths and/or the frequencies of traveled path segments are visualized.

\* \* \* \* \*